United States Patent [19]

Ruiz-Luna

[11] Patent Number: 5,788,947
[45] Date of Patent: Aug. 4, 1998

[54] METHOD FOR THE PRODUCTION OF ANHYDROUS ALKALI METAL CARBONATES

[76] Inventor: Raymundo Ruiz-Luna, Vista-Residencia 350, Colonia Linda Vista, Mexico 14, D. F., Mexico

[21] Appl. No.: 598,283

[22] Filed: Feb. 8, 1996

Related U.S. Application Data

[63] Continuation of Ser. No. 287,870, Aug. 9, 1994, abandoned.

[51] Int. Cl.$^6$ ................................................. C01B 31/30
[52] U.S. Cl. ........................................ 423/420.2; 423/427
[58] Field of Search ........................... 423/420.2, 427; 106/401; 252/182.11; 23/302 T; 264/12

[56] References Cited

U.S. PATENT DOCUMENTS

| | | | |
|---|---|---|---|
| 3,212,848 | 10/1965 | Tasiaux | 23/63 |
| 3,334,963 | 8/1967 | Sisson, et al. | 23/63 |
| 3,628,919 | 12/1971 | Beauchamp | 23/301 R |
| 4,260,594 | 4/1981 | Verlaeten et al. | 423/421 |
| 4,283,372 | 8/1981 | Frint et al. | 423/206 |
| 4,288,419 | 9/1981 | Copenhafer et al. | 423/190 |
| 5,238,664 | 8/1993 | Frint et al. | 423/206.2 |
| 5,275,794 | 1/1994 | Luna | 423/190 |
| 5,288,472 | 2/1994 | Ruiz | 423/187 |
| 5,395,806 | 3/1995 | Adams, Jr. et al. | 423/420.2 |

FOREIGN PATENT DOCUMENTS

| | | | |
|---|---|---|---|
| 744521 | 7/1970 | Belgium | 423/427 |

*Primary Examiner*—Michael Lewis
*Assistant Examiner*—Stuart L. Hendrickson
*Attorney, Agent, or Firm*—Ladas & Parry

[57] ABSTRACT

A method for producing anhydrous alkali metal carbonates by mixing sodium bicarbonate with a stoichiometric equivalent of an alkaline metal hydroxide in an aqueous solution which reacts in an exothermic reaction to produce a thermally stable alkaline compound of the bicarbonate and hydroxide used, free of other compounds. On dehydrating, without the need of higher temperatures of calcination, one yields an anhydrous alkali metal carbonate or a mixed alkali metal carbonate depending on whether the alkali metal hydroxide used is not sodium but some other member of the alkali metal family. The active element on hydration of these mixed alkali metal carbonates is the alkali metal of the hydroxide used with the sodium bicarbonate to produce the anhydrous mixed alkali metal carbonate.

12 Claims, No Drawings

METHOD FOR THE PRODUCTION OF ANHYDROUS ALKALI METAL CARBONATES

This application is a continuation of application(s) Ser. No. 08/287,870 now abandoned filed on Aug. 9, 1994.

FIELD OF THE INVENTION

The present invention refers to a method for the production of anhydrous alkali metal carbonates from alkali metal hydroxides and an alkali metal bicarbonate, sodium bicarbonate.

PRIOR ART

U.S. Pat. No. 3,212,848 relates to the production of sodium carbonate by reacting solutions of caustic soda with a carbonating agent constituted at least in part of sodium bicarbonate, in the presence of anhydrous sodium carbonate. Different methods have been suggested for the carbonation of caustic soda solutions obtained by the electrolysis of sodium chloride, both in diaphragm and in mercury cells. All of these methods involve the use of gaseous carbon dioxide as the carbonating agent.

It is, however, well known that sodium carbonate can be obtained by reacting caustic soda with sodium bicarbonate according to the equation:

$$NaOH + NaHCO_3 \rightarrow Na_2CO_3 + H_2O$$

In a conventional method of making dense soda-ash, 16% by weight of water is added to light soda, and the sodium carbonate monohydrate crystallizes out, the monohydrate is then calcined to produce sodium carbonate. According to the above patent, a mixture of light soda, as aforementioned and crude sodium bicarbonate and, instead of water, an aqueous solution of caustic soda are introduced into an apparatus, for example a mixer, designed for the crystallization of the monohydrate.

Using the process, sodium carbonate monohydrate can thus be obtained in practically the same condition as heretofore secured from light soda and water, and after calcining, i.e. in a rotary drier a dense soda is recovered which is practically identical with the dense soda of commerce.

According to U.S. Pat. No. 3,334,963 sodium carbonate is produced by mixing crude wet sodium bicarbonate crystals with an aqueous solution of sodium hydroxide, the ratio of bicarbonate to hydroxide in terms of sodium carbonate equivalents being from 6:1 to 1:1 in the presence of a total of 15–40% by weight of water thereby forming substantial amounts of sodium sesquicarbonate. The mixture thus obtained is then calcined to yield low density anhydrous sodium carbonate having a large particle size and excellent absorptive capacity.

The above patent relates to a method of manufacturing an alkali metal carbonate and comprises the steps of mixing together an alkali metal bicarbonate and alkali metal hydroxide in a sequence to insure formation of at least substantial amounts of solid alkali metal sesquicarbonates without evidence of an anhydrous double salt, calcining the mixture thus obtained at a temperature sufficient to insure decomposition to an anhydrous alkali metal carbonate and recovering the product thus produced. Thus from the foregoing one can appreciate that in this patent granular sodium carbonates of somewhat lower apparent bulk density than light ash but of particle size comparing favorably with dense soda-ash can be obtained by agglomerating crude bicarbonate obtained from the ammonia soda process and caustic soda, with water within a specified range of 15–40% of the total mixture and calcining said agglomerate.

U.S. Pat. No. 4,260,594 relates to a method for the manufacture of crystals of sodium carbonate monohydrate from carbonated aqueous solutions of sodium hydroxide. The above invention provides a method for the manufacture of crystals of sodium carbonate monohydrate by crystallizing sodium carbonate monohydrate from a carbonated aqueous sodium hydroxide liquor above 35° C., and separating the crystals obtained and a mother liquor. Carrying out the crystallization of the sodium carbonate monohydrate on seed crystals of sodium carbonate monohydrate obtained by evaporation, between 35° to 107.5° C. of an aqueous solution of sodium carbonate free from sodium hydroxide. Because seed crystals which contain dissolved sodium hydroxide have an unfavorable influence on the morphology of monohydrated sodium carbonate crystals formed by crystallization from a carbonated liquor of sodium hydroxide on the seeds and that to avoid the problem seed crystals should be used which are obtained by evaporation at a temperature of 35° to 107.5° C., of an aqueous solution of sodium carbonate free from sodium hydroxide.

In U.S. Pat. No. 3,628,919 to Beauchamp, there is described a process for crystallizing sodium carbonate (possibly monohydrated) starting from aqueous solutions containing organic materials. It aims more particularly at furnishing a process which avoids the unfavorable action of these organic materials on the sodium carbonate crystals. According to the Beauchamp process, sodium carbonate is crystallized onto seed crystals obtained under good crystallization conditions. The choice of the source of seed crystals is not however critical. Further, the Beauchamp patent is not concerned with the use of carbon dioxide ($CO_2$) to carbonate an aqueous solution of sodium hydroxide and then evaporated to produce seed crystals of sodium carbonate monohydrate free of sodium hydroxide.

BACKGROUND

ALKALI METAL CARBONATE MARKET

The major use of sodium carbonate is in the glass industry that prefers a dust-free material with a high bulk density characteristics also favored by the metallurgical industry. The cleaning and the detergent industry generally use a dust-free sodium carbonate with a large particle size and a low bulk density, special products that require a high solubility use the potassium instead of the sodium carbonate to furnish the alkali metal needed to produce these compounds.

CHLOR-ALKALI INDUSTRY

The constant growing demand for chlorine in the industry supplied by the chlorine produced by the chlor-alkali electrolytic cells with the co-production of an equivalent amount of sodium hydroxide, has created a surplus of caustic soda that has become a permanent structural feature of the chlor-alkali industry. Consequently an economic incentive to convert this surplus to other products such as sodium bicarbonate, with a low cost, that may be used as raw material to produce compounds that are in demand.

SUMMARY OF THE INVENTION

THE ALKALI METALS

Group IA of the Periodic Table of the Elements

Li—Na—K—Rb—Cs—Fr

This metal family is very active and one of its members cesium is the most active of all the metals. The high degree of ionization of the hydroxides of the alkali metals and the strong basic nature of their aqueous solutions gives the family its name. All the alkali metals form carbonates. These alkali metal carbonates differ from the carbonates of other metals in that when heated to high temperatures, they do not decompose to the metal oxide and carbon dioxide; also they are very soluble in water with the exception of lithium carbonate that decomposes at 1270° C.

The soluble alkali metal carbonates hydrate and hydrolyze to give basic solutions. This may be defined as a deprotonization reaction.

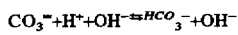

SODIUM CARBONATE

Heats of Formation

A) Hydration of sodium carbonate to form sodium hydroxide and sodium bicarbonate is a mild endothermic reaction.

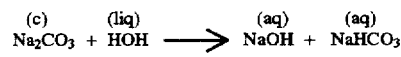

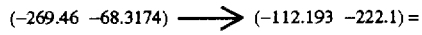

+3.4844 Kg. Cal/gm. mol.

B) Equivalent amounts of aqueous sodium hydroxide and sodium bicarbonate react in an exothermic reaction to give a thermal stable associated alkaline compound.

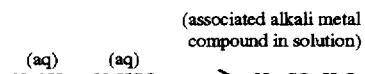

−9.1544 Kg. Cal/gm. mol.

C) The sum of A+B=C

A=+3.4844 Kg.Cal/gm.mol
B=−9.1544 Kg.Cal/gm.mol
A+B=C=−5.67 Kg.Cal/gm.mol

D) An aqueous solution of sodium carbonate is the result of an exothermic reacting on hydrating sodium carbonate.

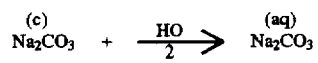

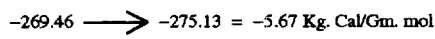

Sum of heats of formation -Sodium

A+B=C=D=−5.67 Kg. Cal/gm.mol

POTASSIUM CARBONATE

Heats of Formation

A) Hydration of potassium carbonate to form potassium hydroxide and potassium bicarbonate is a moderate endothermic reaction.

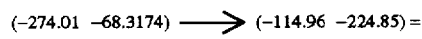

+2.5174 Kg. Cal/gm. mol.

B) Equivalent amounts of aqueous potassium hydroxide and potassium bicarbonate react to form a thermally stable associated alkaline compound in an exothermic reaction.

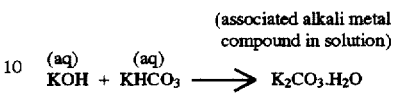

−9.4074 Kg. Cal/gm. mol.

C) The sum of A+B=C

A=+2.5174 Kg.Cal/gm.mol
B=−9.4074 Kg.Cal/gm.mol
A+B=C=−6.89 Kg.Cal/gm.mol

D) An aqueous solution of potassium carbonate is the result of an exothermic reaction on hydrating potassium carbonate.

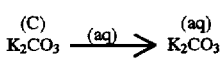

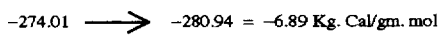

Sum of heats of formation -potassium

A+B=C=D=−6.89 Kg.Cal/gm.mol

Then:

It can be stated that alkali metal carbonates are anhydrides that hydrate to form hydroxides and bicarbonates that associate to form thermally stable alkaline compounds in solution, composed of equal molar parts of an alkali metal hydroxide and an alkali metal bicarbonate. A solution of an alkali metal carbonate has identical chemical properties to that of an aqueous solution made by mixing equal molar quantities of an alkali metal hydroxide with an alkali metal bicarbonate, which on drying results in the carbonate of the alkali metals used.

In this process an alkali metal bicarbonate, sodium bicarbonate, is mixed with a stoichiometric equivalent in aqueous solution of an alkali metal hydroxide to form an alkaline thermally stable compound in an exothermic reaction which on drying yields an anhydrous alkali metal carbonate composed of the alkali metals of the hydroxide and bicarbonate used. In this compound when two different alkali metals are used the active metal element in the mixed carbonate is the alkali metal of the hydroxide used, the heretofore mentioned anhydrous mixed alkali metals carbonate is a compound and not a physical mixture of two different alkali metal carbonates.

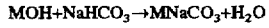

DESCRIPTION OF THE PREFERRED EMBODIMENTS

The present invention has discovered a method for producing a thermally stable alkaline compound free of other compounds by the mixing of equimolar amounts of an alkali metal bicarbonate sodium bicarbonate, with an alkali metal hydroxide in aqueous solution. To produce an anhydrous neutral (equimolar amounts of sodium and potassium, free of unreacted bicarbonate) mixed potassium sodium carbonate, sodium bicarbonate is mixed with an equimolar amount in aqueous solution of potassium hydroxide to form an unsaturated solution that is dehydrated preferably in a spray drier with an outlet air temperature above 93° C., to yield an anhydrous mixed potassium sodium carbonate with a low bulk density, crystals of a large particle size free of dust; in this anhydrous compound the active metal on hydration is the potassium of the hydroxide used to make the carbonate.

$$KNaCO_3 + H_2O \rightarrow KOH + NaHCO_3$$

In another embodiment of the present invention sodium bicarbonate is mixed with an equimolar amount of sodium hydroxide in an aqueous solution to produce a saturated solution that is dehydrated preferably in a spray drier with an outlet air temperature above 93° C., to yield anhydrous sodium carbonate crystals with a low bulk density and a large particle size free of dust.

In another embodiment of the present invention consists in producing sodium carbonate monohydrate crystals of exceptional size by mixing sodium bicarbonate with a stoichiometric equivalent with respect to sodium content of an aqueous solution of sodium hydroxide and crystallizing on seed crystals produced by the evaporation of the water introduced with the sodium hydroxide at a temperature below 107.5° C. from the mother liquor obtained by the filtration of the sodium carbonate monohydrate crystals from a solution free of other compounds. The sodium carbonate monohydrate crystals are dehydrated yielding anhydrous sodium carbonate as a dense soda-ash with a large particle size free of dust.

EXAMPLE I

To produce an anhydrous mixed potassium sodium carbonate, sodium bicarbonate is mixed with a stoichiometric equivalents of potassium hydroxide in an aqueous solution, mixture that reacts in an exothermic reaction to form a thermally stable alkaline product composed of equal equivalents of hydroxide and bicarbonate free of other compounds, which is dehydrated to produce a mixed potassium sodium carbonate. 919 kgs. of 50% potassium hydroxide are diluted with 1378 kgs. of water to form a 20% solution by weight of potassium hydroxide to which is added 689 kgs. of sodium bicarbonate to form a 33.3% solution of a mixed potassium sodium carbonate free of other compounds which is heated to 100° C. This solution is preferably dried in a spray drier with an air outlet temperature above 93° C. to evaporate 1986 kgs. of water to produce 1000 kgs. of a light mixed anhydrous, potassium sodium carbonate compound formed by particles of a large size free of dust with a bulk density of 500–750 grams per liter.

EXAMPLE II

To produce large crystals of sodium carbonate monohydrate using sodium bicarbonate that is mixed with a stoichiometric equivalent of sodium hydroxide in a saturated solution containing a suspension of sodium carbonate monohydrate, these crystals are then dried preferably in a rotary drier to yield an anhydrous neutral sodium carbonate as a dense soda-ash with a large particle size free of dust with a bulk density of 950–1100 grams per liter. To 900 kgs. of a 30.5% solution of sodium carbonate with 28.5 kgs. of sodium carbonate monohydrate in suspension and temperature about 50° C. are added 160 kgs. of 50% sodium hydroxide. With the dilution of the 50% sodium hydroxide and the crystallization of 37 kgs. of sodium carbonate monohydrate on the seed crystals, the temperature of the solution rises above 80° C. To the suspension of 75.5 kgs. of sodium carbonate monohydrate in a solution of 8.2% sodium hydroxide by weight are introduced 168 kgs. of sodium bicarbonate and an additional 162.5 kgs. of sodium carbonate monohydrate crystallizes on the sodium carbonate monohydrate crystals in suspension. The 248 kgs. of crystallized sodium carbonate monohydrate are separated from the mother liquor and dehydrated yielding 212 kgs. of dense soda-ash, anhydrous sodium carbonate with a bulk density of 950–1100 grams per liter. The mother liquor is evaporated to remove 80 kgs. of water introduced with the 50% sodium hydroxide and 28.5 kgs. of well defined crystals of sodium carbonate monohydrate crystallizes. The suspension is vacuum cooled to 50° C. and contains 274.5 kgs. of sodium carbonate free of other compounds and 28.5 kgs. of sodium carbonate monohydrate crystals in suspension.

EXAMPLE III

To produce a light soda ash with a large particle size, free of dust, and a bulk density of 500–700 grams per liter, sodium bicarbonate is mixed with a stoichiometric equivalent of sodium hydroxide in aqueous solution and dehydrated preferably in a spray drier with an air outlet temperature above 93° C. To 754.8 kgs. of 50% sodium hydroxide are diluted with 1731.4 kgs. of water to form a 15.2% solution of sodium hydroxide to which is added 792.5 kgs. of sodium bicarbonate to form a 30.5% solution of sodium carbonate free of other compounds which is heated to 100° C. This solution is then dried preferably in a spray drier with an air outlet temperature above 93° C. to evaporate 2278.7 kgs. of water yielding 1000 kgs. of light soda-ash, anhydrous sodium carbonate with a bulk density 500–700 grams per liter and a large particle size free of dust.

SCOPE OF THE INVENTION

This process in which an alkali metal bicarbonate sodium bicarbonate, is mixed with a stoichiometric equivalent of an aqueous solution of an alkali metal hydroxide to form a thermally stable compound composed of sodium hydroxide and sodium bicarbonate free of other compounds which on drying yields an anhydrous carbonate of the alkali metal or metals of the hydroxide and bicarbonate used has a wide range of applicability. To produce a mixed anhydrous alkali metal carbonate of potassium sodium carbonate the alkali metal of the hydroxide used is potassium hydroxide, this mixed anhydrous potassium sodium carbonate when hydrated gives an alkaline reaction in which the potassium ion is the active element furnishing a substitute for the potassium carbonate used in the production of certain products that require potassium.

In another embodiment the production of large crystals of sodium carbonate monohydrate with a well defined morphology using sodium bicarbonate and a stoichiometric equivalent of sodium hydroxide, are formed by crystallizing on the seed crystal of sodium carbonate monohydrate produced when the water introduced with the sodium hydroxide is evaporated from the mother liquor from the filtration of the sodium carbonate monohydrate composed of a thermally stable alkaline compound of sodium hydroxide and sodium bicarbonate free of other compounds. Thus on drying without the need of calcination at higher temperatures, produces in a very economical manner dense soda-ash with a bulk density of 950–1100 grams per liter composed of large particles free of dust that may be used in glass making and in metallurgical processes. In another embodiment of this invention light soda-ash is readily produced by mixing sodium bicarbonate with a stoichiometric equivalent of sodium hydroxide and drying without the need of calcination preferably in a spray drier yielding a light soda-ash bulk density 500–700 grams per liter with a large particle size free of dust.

The foregoing examples are given to illustrate, rather than to limit the present invention, it will be appreciated that certain variations may suggest themselves to those skilled in the art. For example, the production of an anhydrous neutral mixed carbonate of rubidium or cesium can be obtained by substituting the potassium hydroxide with rubidium hydroxide or cesium hydroxide for the corresponding potassium hydroxide in the mixed carbonate described herein. The foregoing description is to be clearly understood as given by way of illustration, and not as a limitation to the scope of this invention.

I claim:

1. A method for the production of an anhydrous mixed alkali metal carbonate from potassium hydroxide and sodium bicarbonate using equimolar amounts of each compound, wherein:
   a) to an aqueous solution of potassium hydroxide is added an equimolar amount of sodium bicarbonate to produce an unsaturated solution of a thermally stable alkaline compound resulting from the reaction of said potassium hydroxide and sodium bicarbonate and b) said solution of said compound is heated to approximately 100° C. and is then sent to a spray drier which has an outlet temperature about 93° C., thereby yielding an anhydrous mixed potassium sodium carbonate.

2. A method according to claim 1, wherein to a solution of up to 22% weight of potassium hydroxide is added an equimolar amount of sodium bicarbonate to form a saturated solution of a mixed potassium sodium carbonate.

3. A method according to claim 1 wherein the bulk density of the anhydrous mixed alkali carbonate produced is 500–750 grams per liter.

4. A method according to claim 1, wherein the air for the spray drier that contains combustion gases is substantially free of contaminants.

5. A method for the production of sodium carbonate monohydrate from sodium bicarbonate and sodium hydroxide using equimolar amounts of each compound and dehydrating the resulting crystals to produce anhydrous neutral sodium carbonate as a dense soda-ash, wherein:
   a) sodium hydroxide in solution is introduced into a suspension of sodium carbonate monohydrate crystals in a saturated solution of sodium carbonate at a temperature about 35° C., and part of the sodium carbonate in solution crystallizes as additional sodium carbonate monohydrate on the crystals in suspension,
   b) solid sodium bicarbonate in an equimolar amount to the sodium hydroxide in solution is then added and additional sodium carbonate monohydrate crystallizes on the sodium carbonate monohydrate crystals in suspension,
   c) the sodium carbonate monohydrate crystals are separated and dehydrated yielding dense soda-ash, anhydrous sodium carbonate of bulk density 950–1100 grams per liter, and
   d) the mother liquor is evaporated to eliminate the water introduced with the sodium hydroxide in step (a) and sodium carbonate monohydrate crystallizes to produce a suspension of said sodium carbonate monohydrate crystals in a saturated solution of sodium carbonate, said suspension being recycled to step (a).

6. A method according to claim 5, wherein in step (a) to a saturated solution containing about 30.5% sodium carbonate and sodium carbonate monohydrate crystals in suspension is added 50% sodium hydroxide to produce a solution having about 8.2% by weight of sodium hydroxide.

7. A method according to claim 5, wherein to the sodium hydroxide solution is added a stoichiometric equivalent of solid sodium bicarbonate.

8. A method according to claim 5, wherein in step (d) water introduced with the sodium hydroxide is evaporated from the mother liquid at a temperature below 107.50°C. so that the sodium carbonate monohydrate crystallizes.

9. A method according to claim 5, wherein sodium carbonate monohydrate is separated from the mother liquor and dehydrated to yield an anhydrous sodium carbonate as the dense soda-ash.

10. A method for the production of light soda-ash with bulk density of 500–700 grams per liter from sodium hydroxide and sodium bicarbonate using equimolar amounts of each compound, wherein:
    a) to a solution of about 15.2% by weight of sodium hydroxide is added an equimolar amount of sodium bicarbonate to produce an approximately 30.5% solution carbonate at a temperature of about 35° C. or more,
    b) the approximately 30.5% solution of sodium carbonate is heated to approximately 100° C. and then dried in a spray drier with an outlet air temperature above 93° C.

11. A method according to claim 10, wherein the bulk density of the anhydrous sodium carbonate of 500–700 grams per liter is varied by changing the concentration of the solution fed to the spray drier, wherein a higher concentration of solids in the solution results in a higher bulk density of the dried anhydrous product.

12. A method according to claim 10, wherein the heated air for the spray drier that contains combustion gases is free of contaminants.

* * * * *